United States Patent [19]

Marshall

[11] Patent Number: 5,521,932
[45] Date of Patent: May 28, 1996

[54] SCALABLE SIDE-PUMPED SOLID-STATE LASER

[75] Inventor: Larry R. Marshall, Reston, Va.

[73] Assignee: Light Solutions Corporation, Mountain View, Calif.

[21] Appl. No.: 237,123

[22] Filed: May 3, 1994

[51] Int. Cl.[6] ...................................................... H01S 3/04
[52] U.S. Cl. ............................................................ 372/36
[58] Field of Search .................................. 372/75, 66, 36

[56] References Cited

U.S. PATENT DOCUMENTS

| | | | |
|---|---|---|---|
| 3,982,201 | 9/1976 | Rosenkrantz | 372/75 |
| 4,035,742 | 7/1977 | Schiffer | 372/6 |
| 4,272,733 | 6/1981 | Walling et al. | 372/41 |
| 4,354,272 | 10/1982 | Schwob et al. | 372/36 |
| 4,383,318 | 5/1983 | Barry et al. | 372/6 |
| 4,553,238 | 11/1985 | Shaw et al. | 372/66 |
| 4,567,598 | 1/1986 | Noguchi et al. | 372/36 |
| 4,653,056 | 3/1987 | Bayer et al. | 372/27 |
| 4,710,940 | 12/1987 | Sipes | 372/75 |
| 4,723,257 | 2/1988 | Baer et al. | 372/108 |
| 4,805,177 | 2/1989 | Martin et al. | 372/34 |
| 4,908,832 | 3/1990 | Baer | 372/75 |
| 5,084,886 | 1/1992 | Martin | 372/36 |
| 5,181,211 | 1/1993 | Burnham et al. | 372/21 |
| 5,187,714 | 2/1993 | Okazaki et al. | 372/36 |
| 5,265,113 | 11/1993 | Halldörsson et al. | 372/36 |
| 5,265,115 | 11/1993 | Amano | 372/36 |
| 5,267,252 | 11/1993 | Amano | 372/36 |
| 5,341,388 | 8/1994 | Masuda et al. | 372/36 |

OTHER PUBLICATIONS

Kaz, A. and Marshall, L. R., (May 1993), "Continuous-Wave Diode-Pumped Lasers and Parametric Oscillators", *CLEO '93*, Baltimore, MD, CWD1, pp. 244–245.

Kasinski, J. J., et al., (Apr., 1992), "One joule output from a diode-array-pumped Nd: YAG laser with side-pumped rod geometry", *IEEE J. Quantum. Electron.*, vol. QE-28, No. 4, pp. 977–985.

Marshall, L.R., et al., (Apr. 1992), "Intracavity Doubled Mode-Locked and CW Diode-Pumped Lasers", *IEEE Journal of Quqntum Electronics*, vol. 28, No. 4, pp. 1158–1163.

Gerstenberger, D. C., et al., "High peak power operation of a diode-pumped Q-switched Nd: YAG laser", *Opt. Letter.*, vol. 15, No. 2, pp. 124–126, Apr. 1990.

Anthon, D. W., et al., (1990), "Stable multilongitudinal-mode operation of a diode-pumped twisted-mode intractivity doubled ND: YAG laser", *CLEO '90*, Wednesday May 23, 1990, CWC4, pp. 232–234.

Marshall, L. R., et al., (1990), "An Efficient Source at 1.59 Microns", *OSA Proceedings on Advanced Solid-State Lasers*, vol. 6, Mar. 5–7, 1990, pp. 271–273.

Schutz, I. et al., (1990), "Self-Frequency doubling Nd: YAB laser pumped by a diode laser", *CLEO '90*, Wednesday May 23, 1990, CWC4, pp. 232–234. (no month).

Burnham, R. and Hays, A. D., (Jan. 1989), "High-power diode-array-pumped frequency-doubled Nd: YAG laser", *Opt. Lett.*, vol. 14, No. 1, pp. 27–.

(List continued on next page.)

*Primary Examiner*—Rodney B. Bovernick
*Assistant Examiner*—Robert E. Wise
*Attorney, Agent, or Firm*—Lahive & Cockfield

[57] ABSTRACT

A side-pumped solid laser employs diode array pumping to produce a near-diffraction-limited output beam in at least one dimension of the output beam, while maintaining high efficiency operation. Conversion efficiency is enhanced by orientation of a nonlinear crystal for enhanced beam quality along one axis, while improved beam quality is obtained in the other dimension by increasing absorption of the diode light within the laser crystal, reducing the crystal width, and/or a multi-pass reflector on the crystal face opposite the pumped face. The laser may be used in frequency doubling or wavelength shifting systems employing non-linear optical media. In that case, the output beam has its good axis preferentially aligned to enhance stability or prevent walkoff.

20 Claims, 4 Drawing Sheets

OTHER PUBLICATIONS

Hanson, F. and Haddock, D., (Jan. 1988), "Laser diode side-pumping of neodymium laser rods", *Appl. Opt.*, vol. 27, No. 1, pp. 80–83.

Fan, T. Y. and Byer, R. L., (Jun. 1988), "Diode Laser--Pumped Solid State Lasers", *IEEE Journal of Quantum Electronics*, vol. 24, No. 6, pp. 895–912.

Zhou, B. et al., (Feb. 1985), "Efficient, frequency-stable laser-diode-pumped Nd: YAG laser", *Optics Letters*, vol. 10, No. 2, pp. 62–64.

Kubodera, K. and Noda, J., "Pure single-mode $LiNdP_4O_{12}$ solid-state laser transmitter for 1.3-μm fiber-optic communications", *Appl. Opt.*, vol. 21, No. 19, pp. 3466–3469, Oct., 1982.

Smith et al., (1980), "100mW laser diode pumped Nd: YAG laser", *Advances in Laser Engineering and Applications, Proc. SPIE*, vol. 247, pp. 144–148. (no month).

Conant, L. C. and Reno, C. W., (Nov. 1974), "GaAs laser diode pumped Nd: YAG laser", *Appl. Opt.*, vol. 13, pp. 2457–2458.

Rosenkrantz, L. J., "GaAs diode-pumped Nd: YAG laser", *J. Appl. Phys.*, vol. 43, No. 11, pp. 4603–4605, Nov., 1972.

SCALABLE SIDE-PUMPED SOLID-STATE LASER

BACKGROUND OF THE INVENTION

The invention relates generally to lasers, and particularly to diode pumped solid-state lasers.

Currently, there are two general physical arrangements for diode pumping solid-state lasers. These are "end pumping", in which the diode pump radiation enters the laser medium along its axis, in the same direction as the laser flux propagates; and "side pumping", in which the pump radiation enters the laser medium from the side, at an angle to the direction of laser flux propagation. End pumped lasers are described in U.S. Pat. Nos. 4,653,056 of Bayer & Keirstead, and 4,710,940 of Sipes.

Side pumping is generally thought to be more readily scalable, the accepted method of achieving this including by adding successively more diode pumps along the length of the medium and also encircling the medium with the pump sources. In the latter case, the diode radiation is often focused into the center of a laser rod, to overlap in a circular region and thus increase gain. This method is used to produce a circular gain volume with a gaussian intensity profile to match the desired profile of a TEMoo laser output.

Continuous wave (CW) diode-pumped lasers are typically of much lower gain than pulsed pumped lasers, especially when built with a side-pumped construction. Devices mentioned above, with diodes encircling the laser rod and their outputs focused within the rod, have produced gains of only 8%, compared to gains of 200% for pulsed pumping.

In addition, the cooling of an encircled rod laser device must be achieved with liquid because the heat sources are dispersed three dimensionally; i.e., there is no common contour through which the heat could be extracted conductively by a common metal sheet or surface. Typically, the laser rod is surrounded by a sleeve which flows cooling water, and the diode pump light must pass through this sleeve to reach the laser rod.

Another laser configuration is the slab laser, in which the pumping light is spread uniformly over the side of the laser crystal and the laser beam zig-zags through the laser medium, reflecting multiple times off the pumped faces. This laser obtains better overlap between laser mode and pumped volume, than in the side-pumped laser rod. Inventors have gone to great lengths to develop slab constructions that will improve beam quality and efficiency of sidepumped lasers. For example, diode pumped slab constructions have used end-pumping techniques to match the focused output of a single diode emitter to the cavity mode at each bounce point along the slab, as in U.S. Pat. Nos. 4,908,832 and 4,710,940. These techniques are efficient, but are extremely alignment sensitive. In practice, such systems are limited if power scaling is attempted, because each additional bounce increases the alignment sensitivity of the laser.

Power scaling by increasing the length of the laser crystal to accommodate more diodes, leads to other problems. Longer crystal are more susceptible to bowing and to stresses that introduce birefringence and cause beam aberrations. Linear losses increase with laser crystal length, and become especially significant in lower gain CW-pumped lasers. Increasing the pump power on a single short crystal is therefore more effective than using longer crystals and spreading out the pump power along the crystal length.

Side-pumped lasers generally sacrifice efficiency for beam quality. In rod lasers encircled by diodes whose outputs overlap in the center of the rod, the laser energy near the rod edges, where the diode light first enters the rod, is largely wasted and does not contribute to the laser output. For high efficiency and good beam quality, one must match the mode of the laser, which is determined by the shape of the optical cavity, to the diode pump volume, which is determined by the diode imaging optics and the laser crystal's absorption characteristics. In multimode operation, however, side pumped lasers may be as efficient as end pumped lasers because all of the pumped volume can be filled by multiple cavity modes.

For typical cavities employed in compact lasers, the TEMoo (lowest order, highest beam quality) mode is typically less than 1 mm in diameter. Larger modes can be produced by lengthening the cavity or employing graded reflectivity mirrors, but these changes produce larger losses and reduce efficiency for low gain CW-pumped lasers. To obtain TEMoo mode operation of the laser, the diode pump light must be contained within this less than 1 mm region. In side pumping, the absorption depth of the material is generally larger than 1 mm (typically 3 mm for Nd:YAG), so it is difficult to confine the pump light to the central volume required by the TEMoo mode. Generally, apertures must be employed to confine the laser mode, and such spatial filters typically lower the efficiency for TEMoo operation to about 50% of that achieved in multimode operation.

The prior art patents identified above state that side-pumping, (also called transverse or lateral pumping) does not provide mode matching and is therefore inefficient for producing a low divergence or high quality laser output (i.e., TEMoo mode output). There is clearly a need for a side-pumped laser construction that is simpler, more readily scalable, and capable of providing good beam quality output.

SUMMARY OF THE INVENTION

A laser apparatus according to the present invention provides a high gain CW pumped laser using a novel technique that maximizes gain while also controlling mode quality of the laser output.

Applicant has realized that many applications such as non-linear conversion, and laser machining can be implemented with beams that are diffraction limited in only one dimension, and applicant has developed laser apparatus according to the present invention wherein the laser mode is not required to be a circular TEMoo mode as in previous work, but rather, the mode is near TEMoo in one dimension only, and multimode in the other. A laser apparatus according to the invention images the outputs of many laser diodes or diode arrays into a line focus, overlaps the line foci within a laser crystal, and produces a single laser output of better beam quality than the diodes.

Laser apparatus according to the invention eliminates alignment sensitivity of diode pumping position relative to laser mode position by arranging pump diodes about a lasing crystal. The only direction the diode pump volume can move to affect the laser mode is perpendicular to the plane of pumping. A prism geometry of the laser crystal allows the laser mode to simply "follow" the pump volume with a displacement of the beam in the direction perpendicular to the lasing direction, resulting in no misalignment relative to the laser mirrors.

Laser apparatus according to the invention uses a prism as the laser gain medium, rather than a rod, allowing simple one dimensional conductive cooling, rather than complicated three dimensional liquid flow loops. The laser crystal is simply sandwiched between two pieces of metal which conduct the heat away from the laser crystal along a direction normal to the pump axis and the cavity axis.

The edge of the laser medium is a straight line, rather than a curved surface as with a rod laser, and a laser mode can approach close to this edge without suffering the high diffraction losses incurred in prior art laser media. Thus, more of the diode pump energy near the laser medium's edges contributes to laser output, enhancing power output.

Laser apparatus according to the invention preferably employs cylindrical lenses to collimate the output of the diodes into the side of the laser medium. Typical collimated beam widths can be on the order of 0.2 mm. This collimation confines the mode of the generated laser output in one dimension so that the gain volume is a flat sheet of small height, rather than a circular or elliptical spot as in previous constructions. At the same time, positive thermal lensing caused by energy in this one-dimensional gain volume further confines the laser mode within the gain volume. The laser output can be made diffraction limited in the confined dimension using conventional techniques, just as the output of a diode bar is diffraction limited in one direction. The mode quality can further be constrained in the other dimension by limiting the width of the laser crystal.

In laser apparatus constructed in accordance with the present invention, scaling is achieved by adding more diodes, lying in the same plane but inclined at angles to the lens such that their outputs overlap throughout the laser medium. This total overlap of the pump beams is unlike that in a laser rod encircled by diodes, where the beams only overlap in the center and leave hot spots around the edge of the rod where each diode pumps alone.

Using flat geometry of a laser crystal prism, applicant miniaturizes the entire laser head, and also arranges for all the heat to be extracted through a common surface. A novel heat sink design houses the laser crystal, allows the crystal to be pumped by diodes from both sides, and allows uniform cooling through the top and bottom of the crystal, with all heat flowing through the bottom of the mourn and thence into a common heat sink. The device is preferably cooled by solid contact conductively, with a heat sink mounted to the base of the laser head and a fan to remove the heat.

DESCRIPTION OF THE PREFERRED EMBODIMENTS

Figure 1:
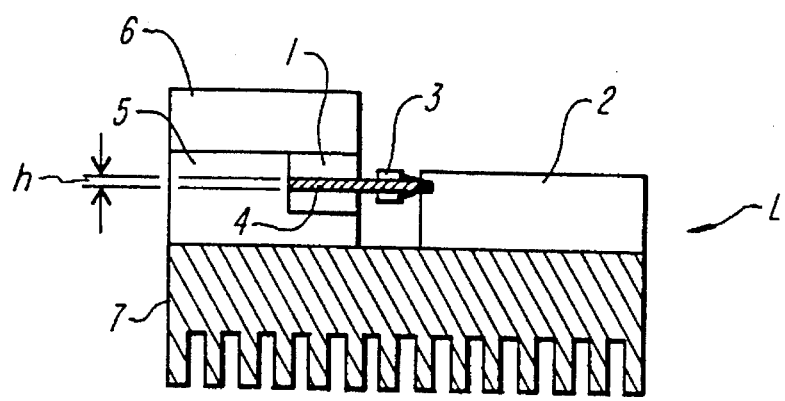
FIG. 1 is an end view of a first embodiment of a side-pumped solid-state laser assembly according to the invention, including mounting plate, diode array, heat sink, and other associated components.

In the drawings, FIG. 1 shows one embodiment of a side-pumped solid-state laser assembly L of the present invention, in end view. The major components are a solid-state laser crystal 1 in the shape of a rectangular prism, and a laser diode array 2. The illustrated assembly includes a cylindrical lens 3 positioned to collimate the output of the diode array 2 so that it illuminates a cross-sectional slice or thin region of the laser crystal 1 which constitutes the active pump volume. The pump volume illuminated by the diode light is shown schematically by the shaded region 4. The laser crystal 1 is sandwiched between two metal blocks, a base block 5 and a cover block 6. The base block 5 and the diode array 2 are mourned upon a common heat sink 7, which may also be liquid cooled by fluid passages (not shown) or simply finned to dissipate heat to ambient as illustrated.

Figure 2:
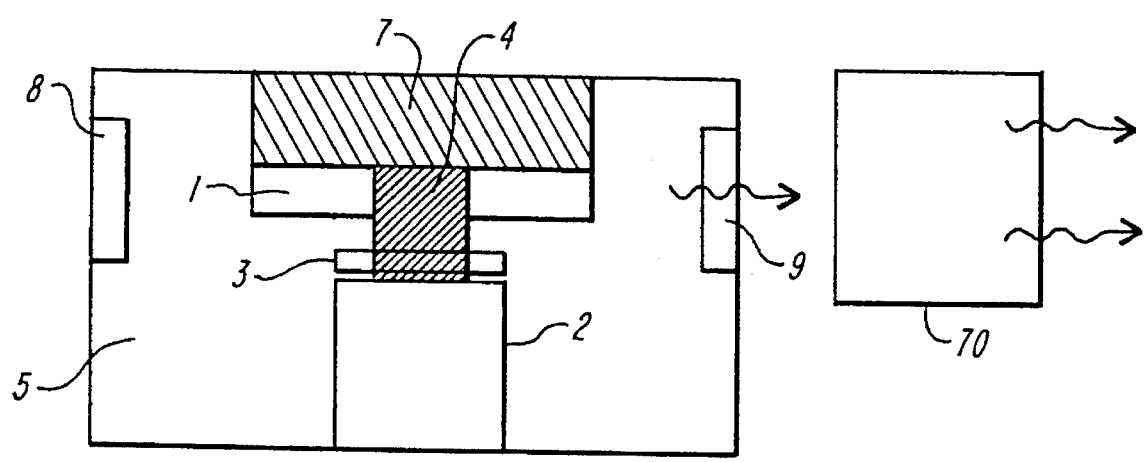
FIG. 2 is the top view of the assembly of FIG. 1, further showing optical cavity mirrors.

FIG. 2 shows the side-pumped solid-state laser assembly L of FIG. 1 in top view. The optical cavity of the laser is formed by a back mirror 8, which is highly reflective at the laser wavelength, and an output coupler 9, which is partly reflecting at the laser wavelength. The mirrors can be formed by reflective or partially reflective coatings, which preferably are deposited directly onto the front and back faces of the laser crystal 1 so as to promote compactness and to enhance alignment stability.

Applicant contemplates that the pumped solid state laser assembly L of FIGS. 1 and 2 may itself have its output coupled to another lasing device, such as a crystal used for wavelength-shifting, an optical parametric oscillator arrangement or the like, such devices being indicated schematically by element 70 in the output beam path. Element 70 may, for example, include a beam focuser and oscillator cavity as shown by elements 30 and 40 of FIG. 1 of U.S. Pat.

Figure 3:
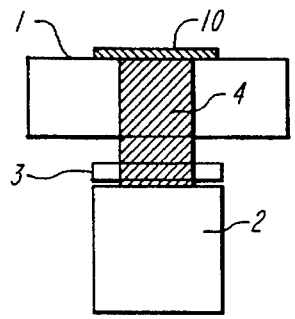
FIG. 3 is a top view of an alternative embodiment of the invention which includes a reflector to obtain two passes of the diode pump radiation.

No. 5,181,255, or constructions such as illustrated in FIGS. 2 and 3 of that patent. However, the discussion below will focus on basic embodiments of the laser diode pumped crystal assembly L, rather than more complex systems utilizing L as a laser source or driver.

In one alternative embodiment, the mirrors 8 and 9 of FIG. 2 can be omitted, and the device can be used as an amplifier to amplify an injected laser beam at the wavelength coinciding with the laser transition in the laser crystal employed.

Another alternative embodiment is shown in FIG. 3 wherein a reflective coating 10 is deposited on the side of the crystal 1 opposite the diode 2, to reflect the diode light which has not been absorbed passing through crystal 1 back into the crystal, overlapping with the incident diode light in the pump region 4. This allows lower dopant levels to be employed in the crystal and still achieve adequate conversion efficiency. This also allows the laser crystal to be thinner along the direction of propagation of the diode illumination, while absorbing the same amount of pump light as a higher dopant crystal that lacks the reflector 10. By constraining the pump volume to occupy a small front-to-back thickness, the beam quality in the pumping direction can be improved.

Figure 4:
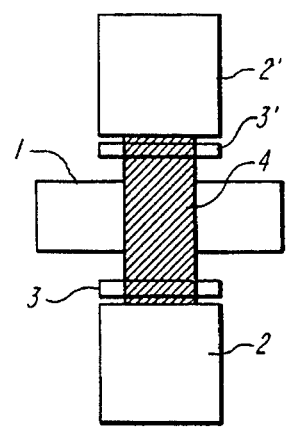
FIG. 4 is a top view of another alternative embodiment of the invention which includes a second diode, pumping the opposite side of the laser crystal, whose output overlaps that of the first diode.

In a second alternative embodiment shown in FIG. 4, a second diode array 2' with lens 3' is positioned opposite to the first diode array 2, to illuminate the same region (i.e., their pump volumes overlapping within the crystal).

Figure 5:
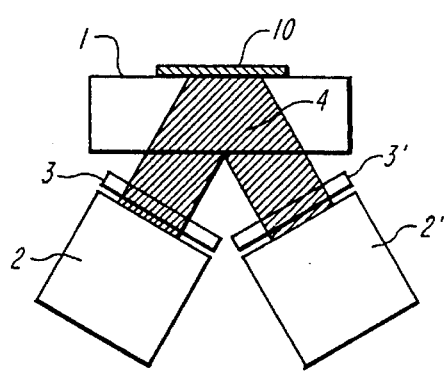
FIG. 5 shows a top view of another alternative embodiment of the invention which includes a retro-reflector as in FIG. 3, and also includes two diodes oriented at angles to allow their beams to overlap within the laser crystal.

A similar result is achieved in a third alternative embodiment, shown in FIG. 5, wherein two or more diode arrays 2, 2' are angled so that their outputs overlap within the laser crystal. A reflector 10 used as above, increases the available absorption depth, placing the two diodes on symmetric reflection paths.

Figure 6:
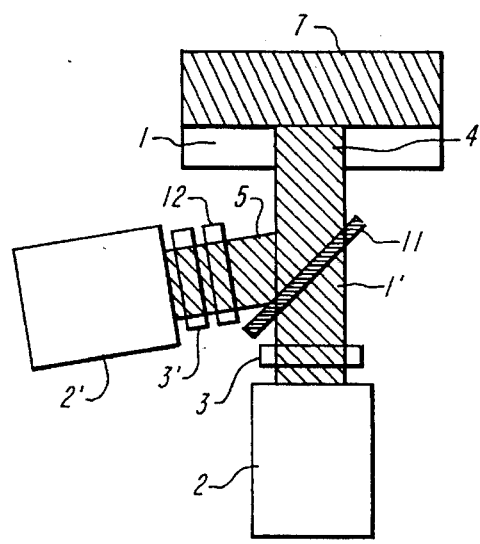
FIG. 6 shows a top view of yet another alternative embodiment of the invention which includes two diodes with outputs coupled into a single beam by means of a polariser.

In yet a fourth alternative embodiment, shown in FIG. 6, the outputs of two diode arrays 2, 2' are combined using a polarizing element such as a Brewster plate 11 coated for maximum transmission of p-polarized light (in the plane of the figure) and maximum reflection of s-polarized light (perpendicular to the plane of the figure), and using a polarization rotating element 12 (such as a half-wave plate) to rotate the polarization of one diode to be orthogonal to the other. Both diode outputs are then imaged into one beam 4 by reflecting the s-polarized light, illustratively, from diode 2' off the polarizing element and transmitting the p-polarized light, illustratively, from diode 2, onto the same path, through the polarizing means. The combined beam 4 of doubled intensity is used to pump the laser crystal 1 as in any of the previous embodiments.

In a fifth alternative embodiment, shown in FIG, 7, four diode arrays 2 pump a single laser crystal 1. Two diodes 2 are placed on each side of the laser crystal 1, and each diode pair on a side is arranged at an angle as in FIG. 5 so that their outputs reflect to each other off the far face of the crystal and their outputs 4 overlap within the laser crystal 1. Each also overlaps to some extent with the diagonally opposite laser diode pair, which is operated at the same frequency.

Figure 7:
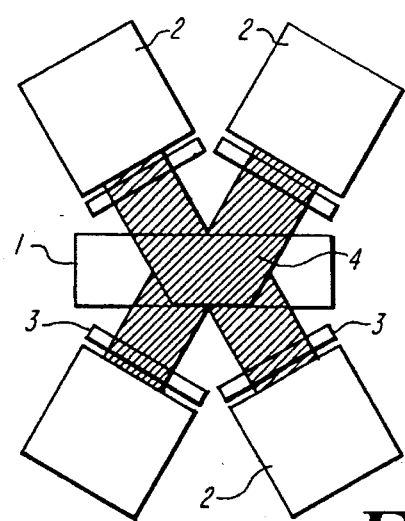
FIG. 7 shows a top view of still another embodiment of the invention which includes four diodes, two on each side of the laser crystal, oriented at angles to allow their beams to overlap as in FIG. 5.
Figure 8:
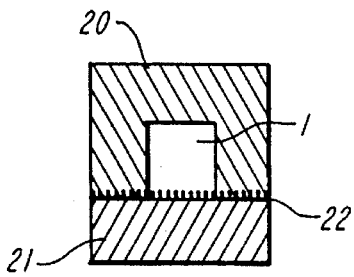
FIG. 8 shows a more detailed end view of part of the embodiment of FIG. 1, showing mounting of the laser crystal.

The alternative embodiments shown in FIG. 4 and FIG. 7 use a crystal mount as shown in FIG. 8. FIG. 8 shows an end view of the laser crystal mount employed for two sided pumping of the laser crystal 1. A top 20, is fastened to a base plate 21, with the laser crystal 1 sandwiched between the top and base pieces. A soft, thermally conducting gasket 22 may be placed between the base and the crystal, and between the base and the top, to enhance thermal contact. The base is fastened to the common heat sink 7 as in FIG. 1.

Figure 9:
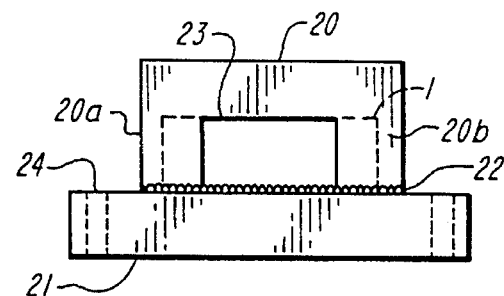
FIG. 9 shows a more detailed side view of part of the embodiment of FIG. 1, showing the mounting of the laser crystal, with access ports that allow pumping of the laser crystal from both sides.

FIG. 9 shows the side view of the crystal mount of FIG. 8. Access ports 23 are cut into the long sides of the mount, perpendicular to the plane of the base. These access ports form windows leading to the crystal 1 which allow the laser crystal 1 to be pumped from both sides, with the diode light. The end walls 20a, 20b of the top piece 20, on either side of the access ports 23, are of sufficient cross-section to allow significant thermal conduction from the top of the crystal 1, through the top piece 20, and into the base plate 21. The gasket 22, may, for example, be made from Indium, to improve heat conduction along this heat path by contact-mating the ends of the top piece to the base.

Figure 10:
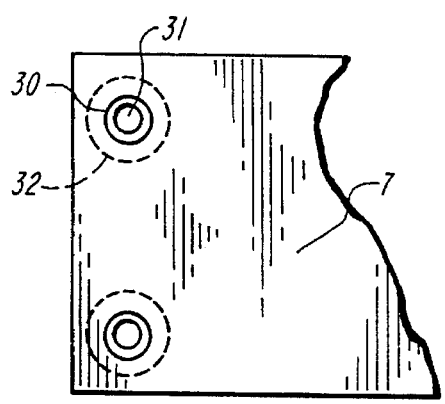
FIG. 10 shows a top view of the diode mounting, including isolating inserts to prevent electrical shorting of the diode when multiple diodes are mounted upon a common plate.

Advantageously, the alternative embodiments of FIGS. 4 to 7 inclusive, have a diode mounting system as shown in FIG. 10. A hole 30 is drilled into the heat sink plate 7. A stepped plug 32 press fits (or is glued) into a larger hole counterbored through the opposite side of the plate to hole 30. The plug seats on a step, formed by the difference in sizes between hole 30 and the larger counterbored hole, which prevents the plug from passing all the way through the hole. The plug has a concentric hole 31.

Figure 11:
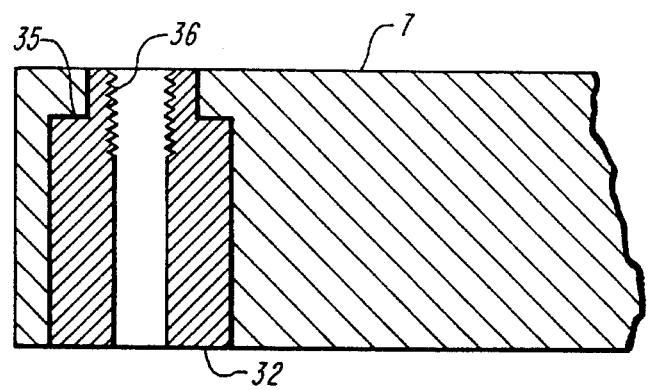
FIG. 11 shows a side view of the diode mounting of FIG. 10.

FIG. 11 shows a side view of the diode mounting system of FIG. 10 taken along the axis of the plug 32. The plug 32 is composed of electrically isolating rigid material such as ultem or delrin polymer. A threaded insert 36 is fitted onto hole 31, to grip screws which are employed to fasten the diode to the heat sink plate 7. The upper end of the plug 32 ends just below the surface of the heat sink plate 7 allowing the diode to be tightened down so that the base of the diode makes surface-to-surface contact with the heat sink plate 7, without obstruction by the plug 32. A gasket of electrically isolating but thermally conducting material such as beryllia, is preferably placed between the diode base and the heat sink plate 7. In addition, gaskets made of flexible thermal conducting material such as Indium, can be placed on either side of the beryllia gasket to further improve thermal conduction.

Figure 12:
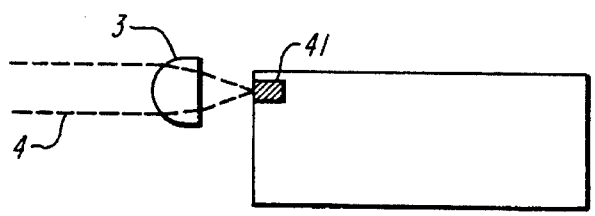
FIG. 12 shows a side view of a diode beam imager.

FIG. 12 shows a side view of the diode imaging means. A plano convex cylindrical lens 3 is placed with its flat face towards the diode emitter 41 to minimize scatter loss of the incident diode light. The beam 4 passing through the lens 3 and out of the curved surface is collimated, and extends uniformly along a direction which in the illustrations is perpendicular to the drawing sheet.

Figure 13:
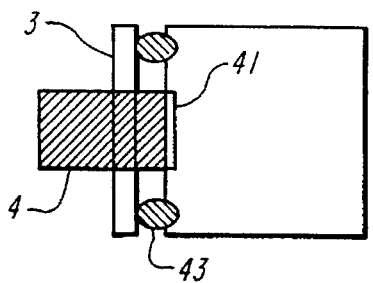
FIG. 13 shows a top view of the beam imager of FIG. 12.

FIG. 13 is a top view of the diode imaging element or beam conditioner 3 of FIG. 12. The lens 3 is fixed in alignment with respect to the diode emitter 41 by gluing the ends of lens 3 to the sides of the diode mount away from the diode emitter 41 using glue dots or standoffs 43 which space the lens 3 out of contact with the diode.

Figure 14:
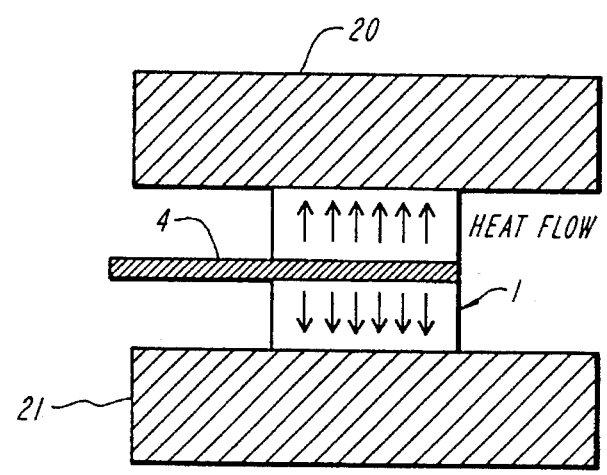
FIG. 14 is a conceptual drawing of diode pump volume inside the laser crystal and a preferred heat sink arrangement showing thermal gradient.

As noted above, the diodes 2 pump the laser crystal 1, and both are mounted on a common heat sink. In operation, heat flow in the laser crystal is shown in the conceptual drawing of FIG. 14. The diode pump volume 4 inside laser crystal 1, generates heat that flows into and is removed by the top block 20 and bottom block 21, which thus produce a linear thermal gradient in the direction of the arrows, upwardly and downwardly from the active pumping volume within the crystal. This is a particularly simple and uniform heat gradient which makes modeling and mode calculation relatively straight-forward, and leads to stable operation.

Figure 15:
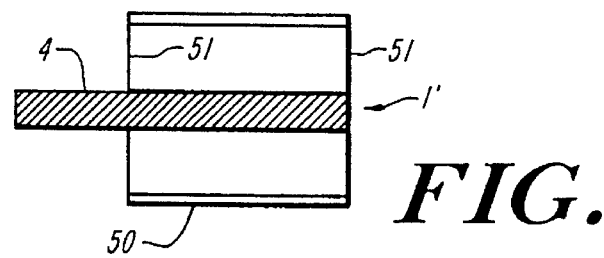
FIG. 15 is a conceptual drawing showing geometry of the laser crystal.

As a rule, laser crystals are machined with beveled ends or corners. In accordance with the present invention, however, the crystal is a flat-faced crystal that is pumped by diodes on one or more sides, and produces a laser beam perpendicular to the diode pump beam (i.e., along a cavity running parallel to the pumping faces), the crystal is preferably machined without bevels in either path. A suitably modified crystal embodiment of the laser crystal 1 has knife edges 51 rather than bevels. FIG. 15 is a conceptual drawing showing the edges 51 of the laser crystal 1 that must be non-beveled, in relation to the direction of diode pumping 4, namely the faces transverse to the pump beam, to prevent scatter and subsequent loss to the laser beam. By avoiding bevels in these regions, the pump is able to interact in the highest intensity region of diode pumping at the entering edge of the laser crystal, significantly improving efficiency and output power. Normally, these edges would be beveled as is typically done in machining crystals. The bevels which would normally be present are shown at 50 in FIG. 15.

Figure 16:
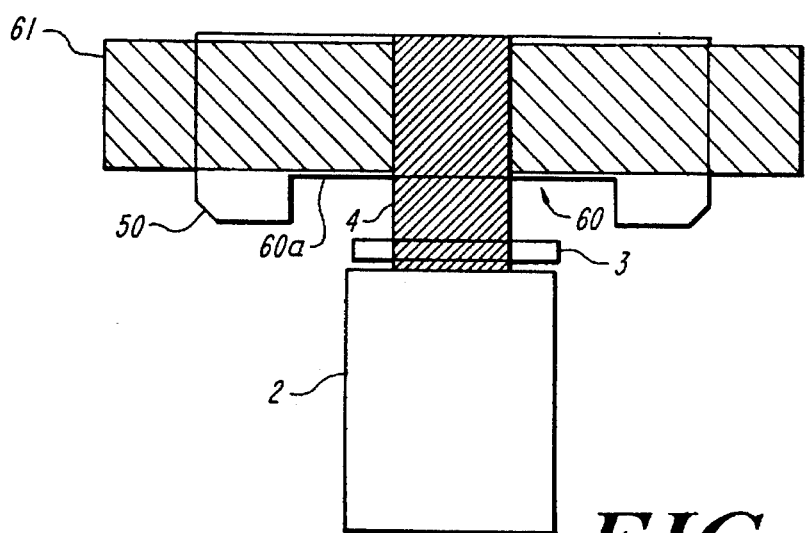
FIG. 16 shows an alternative crystal design which relaxes machining constraints.

In yet another crystal modification, the edges can be beveled provided the crystal has a special shape that prevents the beveled region from participating in laser generation or scattering. FIG. 16 shows such an alternative crystal design which prevents bevel 50 from scattering the laser beam 61. The crystal has a "dug out" section 60 with a recessed face 60a which allows the diode pump radiation 4 to enter the crystal. The laser beam 61 is clipped by the edge of the "dug out", and therefore does not reach the beveled edges 50 of the crystal. The face 60a is polished to window grade and is therefore flat and parallel to the laser beam 61, thus minimizing any scatter losses. This allows the laser beam 61 to interact with the high intensity region of diode pump at the edge of the laser crystal (i.e., just inside the window 60a), and therefore improves efficiency and output power.

In the foregoing discussion, the terms "front" and "back" have been used to describe opposed faces of the laser crystal in which the diode light enters or is reflected, while "top" and "bottom" have been used to describe the opposed faces that are used for thermal contact mounting, directly or indirectly to a heat sink, and "side" faces refer to those through which the induced laser beam traverses its lasing cavity. The laser diode arrays are preferably linear strips, so that they cover long (side-to-side) dimension, while the cylindrical or half-cylindrical lens 3 collimates the laser diode beam so that it has a high intensity along a top-to-bottom beam height "h" (FIG. 1). By arranging that the laser crystal has a high attenuation coefficient at the laser diode wavelength, for example, by doping the crystal appropriately, the diode beam may be absorbed almost entirely within a short front-to-back depth "d", for example, d<1 mm or even 0.1 or 0.2 mm. Control over which modes of the crystal are activated is achieved by varying h and d using the focal properties of lens 3 and absorbance of crystal 1, respectively. Rather than high absorbance, the crystal itself may be made very thin in a front-to-back direction with a reflective face 10 to assure plural passes and achieve optimum gain from the pump beam. For example, crystal 1 may have a front-to-back dimension between 0.1 and 1.0 millimeters. In either case, by focusing the diode into a line volume of cross-section (h×d), this arrangement can produce a very high quality beam.

The laser diode pumped laser crystal of the present invention may itself be used as a pump laser to drive a frequency doubling crystal or a non-linear optical device, and when so employed, advantageously provides a uniquely tailored pump source in which beam shape and quality offer advantages over a conventional circular spot laser, even one of very high beam quality. For example, when the rectangular output beam is made to have a high quality along its short side and is then brought to a line focus, it will have a very high intensity over a much wider area than can be achieved by focusing or otherwise conditioning a conventional circular spot laser beam. Further, when applied to a wavelength-converting nonlinear crystal as described in OSA *Proceedings on Advanced Solid State Lasers*, Mar. 5–7, 1990, pp. 271–273, then the crystal axis which is most sensitive to beam quality can be aligned parallel to the high beam quality direction of the pump laser—that is, perpendicular to the "gain sheet" of the crystal 1. Similarly, the wide direction of the beam may be aligned parallel to the nonlinear crystal axis that produces the greatest walkoff.

Other known techniques are advantageously applied to utilize the laser device in diverse systems. For example, an intracavity Q-switch may be employed to improve quality of the laser output by limiting power produced in the edges of the laser crystal and concentrating it in the center.

In all of the foregoing constructions, a laser diode or diode array is coupled into a flat face of a laser crystal which is a geometric block rather than a rod, and pumps a broad sheet region which can include the region of maximum absorbance immediately inside the diode entry face. Broad area cooling and linear heat gradients across the pump region result in dependable and stable operating parameters, and the architecture permits the deployment of multiple pump diodes or pump diode arrays for enhanced efficiency, increased power, and mode control without introducing alignment problems.

Among various modifications, applicant contemplates that the laser device may employ a laser crystal that has polarization-dependent absorption characteristics and a polarization rotation element changes polarization of the diode light to control the absorption of the diode light in the laser crystal. It may further comprise an intra-cavity Q-switch which Q-switches the laser and improves the beam quality of laser output by limiting power in the edges of the laser crystal and centrally concentrating it. The laser device may produce a rectangular output beam with high beam quality along its short side and include means for focusing the output beam to a line focus to produce high intensity over a wide area. Systems with the laser device may further include a nonlinear optical element to convert wavelengths produced by the laser and improve beam quality by efficiently converting only a central portion of the beam and not the edges, producing an output with better beam quality than would be achieved by intra-cavity doubling a conventional laser with a circular spot. In a system comprising a nonlinear optical crystal to convert the wavelengths produced by the laser, the nonlinear crystal may be oriented so that a nonlinear crystal axis that is most sensitive to beam quality is aligned parallel to the high beam quality direction of the laser beam (that is the direction perpendicular to the gain sheet). Similarly, when nonlinear optical crystals are employed to convert the wavelengths produced by the laser, the nonlinear crystal may be oriented so that the nonlinear crystal axis that produces the largest walkoff is aligned parallel to the wide direction of the laser beam (that is the direction parallel to the gain sheet).

While we have illustrated and described the preferred embodiments of the invention, it is to be understood that these are capable of being varied and modified, and are not limited to the precise details set forth, but include such changes and alterations as occur to those skilled in the art, and defined by the claims appended hereto.

What is claimed is:

1. A laser device comprising,
    a laser crystal having a front end and a back end, and a side, a top and a bottom,
    housing means for holding the laser crystal in fixed position, laser diode pumping means for providing a laser diode light emitted from a linear region, imaging means for directing a uniform beam of the diode light into the side of the laser crystal, said imaging means reshaping the laser diode light into a thin sheet extending along a linear region within the laser crystal and optically aligning the diode pump light within the laser crystal in a desired laser cavity mode, and heat conduction means in thermal contact with the bottom of the laser crystal and having a common surface for removing heat from both the laser crystal and laser diode pumping means.

2. The laser device of claim 1, comprising optical cavity forming means for forming a multi-pass optical cavity around the laser crystal adjacent to the front and back ends of the laser crystal, and including output coupling means including a mirrored surface forming a front end of the laser cavity, and a rear mirror means forming a back end of the laser cavity.

3. The laser device of claim 1 wherein the laser crystal amplifies a laser beam injected by the laser diode pumping means in a diode pump volume within the laser crystal of claim 1.

4. The laser device of claim 1 wherein an at least partially reflective mirror is coated onto the face of the laser crystal opposite a face pumped by the laser diode, to reflect back diode light which has passed through the crystal without absorption, overlapping a region traversed by the diode light to pump the crystal, thereby increasing effective pump intensity.

5. The laser device of claim 1 wherein the diode output is formed into a narrow beam in one dimension by the imaging means, increasing pump intensity while restricting mode volume of the ensuing laser output.

6. The laser device of claim 1 wherein the laser crystal is doped to a level for absorbing the pump light in a narrow region of the laser crystal, thereby to constrain laser mode in a narrow dimension traverse to a dimension of collimation of said imaging means, so that the mode shape is controlled in two dimensions.

7. The laser device of claim 1 wherein the edges of the laser crystal are non-beveled in regions of the crystal which are pumped or lasing.

8. The laser device of claim 1 wherein plural diode arrays are mounted in the same plane, and arranged at angles such that their outputs to overlap with each other in the laser crystal.

9. The laser device of claim 8 wherein the diode arrays are mounted spaced apart along a common side of the laser crystal such that their output beams strike the laser crystal at a high angle of incidence to produce internal reflection enhancing path length of diode light in the crystal.

10. The laser device of claim 1 comprising a mirror coated onto the back of the laser crystal to reflect laser diode light back into the crystal to increase absorbed pump power.

11. The laser device of claim 1 wherein diodes are arranged at angles, on both sides of the laser crystal, with their outputs overlapped within the crystal.

12. The laser device of claim 1 further comprising at least one polarizer to condition a diode output for combining the outputs of two diodes into one beam.

13. The laser device of claim 1 wherein the diode pump volume forms a thin sheet of gain across the center of the laser crystal and cooling occurs through a face parallel to the sheet of gain, so as to achieve near isothermal temperature gradient in the line of gain, and heat flow perpendicular to that line.

14. The laser device of claim 13 wherein the crystal width or absorption length is made small to constrain crystal modes and produce high beam quality laser output in a direction parallel to the diode mounting plane.

15. The laser device of claim 1 wherein the heat conducting means includes a plate with surface shape to mount and thermally contact the bottom of a laser diode mount, said plate having a plurality of holes which are oversize with respect to metal screws used to fasten the laser diode base to the plate, a plurality of plugs made of an electrically insulating material for threadedly receiving metal screws which fasten the laser diode base to the plate, the plugs fitting within the holes and being recessed below the surface of the plate, a thin plate made of electrically insulating but thermally conducting material for interfitting between the plate and the diode base.

16. The laser device of claim 1 wherein the imaging means comprises an optically transparent material with a refractive index between 1.3 and 3, with a front and a back surface between which the diode light passes, the front surface being flat and anti-reflection coated at the laser diode wavelength, the body having a length which equals or exceeds the length of the diode emitting surface, and being oriented along the length of the diode emitting surface, the back surface being curved with a radius between 0.1 and 10 mm, and anti-reflection coated at the laser diode wavelength, mechanical mounting means for holding the edges of the lens to mount the lens in optical alignment with the diode emitters so as to collimate the diode output into a beam of rectangular cross-section with long side parallel to the plane of the diode emitters.

17. The laser device of claim 1 wherein the heat conducting means includes an elongated base made from thermally conducting material, with surface shape matched to the bottom of the crystal for thermal contact with the bottom of the crystal, an elongated top, with surface shape matched to the bottom of the crystal for thermal contact with the bottom of the crystal, and with a channel extending along its length, the channel having dimensions closely matching those of the crystal to be mounted, and fastening means for connecting the base to a common mount.

18. The laser device of claim 1 wherein the housing means includes a top with access ports cut into elongated faces perpendicular to the base surface, where sufficient material remains on either side of these access ports to allow thermal conduction from the upper surface of the channel through the top and into the base, the ports being configured to allow a diode pump beam to pass through and into the laser crystal so as to pump it from both sides.

19. A laser system for producing a laser beam of enhanced shape and quality, such system comprising a thermal mounting base for securing system elements in thermally conductive alignment, a laser crystal prism having opposed top and bottom faces, opposed front and back faces and opposed sides, the bottom being in thermal contact with the base, at least one laser diode array arranged to illuminate the prism through one of said opposed front or back faces, optical means for directing light from the laser diode array into the prism in a pump region forming a thin sheet between front and back of the prism and parallel thereto, and means defining a laser cavity about the pump region along an axis in the sheet transverse to the front/back direction, the optical means providing mode control along one dimension of a line illumination image, and the line illumination image being constrained along another dimension in the pump region to provide a laser beam exiting said cavity of high quality.

20. A method of producing laser light, such method comprising the steps of mounting a laser crystal having opposed top and bottom faces, opposed from and back faces and opposed end faces on a thermally conducting plate, arranging a plurality of laser diodes to illuminate a narrow pump region of said laser through at least one of said front and back faces, and defining a laser cavity between said opposed end faces for extracting a laser beam from said pump region, said thermally conducting plate being conductively mounted to at least one of said top and bottom faces to define a substantially isothermal region shaped like and containing said pump region, said pump region occupying a mode of said laser cavity for producing a high quality output beam.

* * * * *